July 30, 1968 T. C. GOODENOW 3,395,399

INFORMATION STORAGE TIMING ARRANGEMENT

Filed April 15, 1966 2 Sheets-Sheet 1

INVENTOR
T. C. GOODENOW
BY D. E. Suedeker
ATTORNEY

July 30, 1968 T. C. GOODENOW 3,395,399

INFORMATION STORAGE TIMING ARRANGEMENT

Filed April 15, 1966 2 Sheets-Sheet 2

United States Patent Office 3,395,399

Patented July 30, 1968

3,395,399

INFORMATION STORAGE TIMING ARRANGEMENT

Theodore C. Goodenow, Oceanport, N.J., assignor to Bell Telephone Laboratories, Incorporated, a corporation of Delaware Filed Apr. 15, 1966, Ser. No. 542,910
9 Claims. (Cl. 340—172.5)

Figure 1:
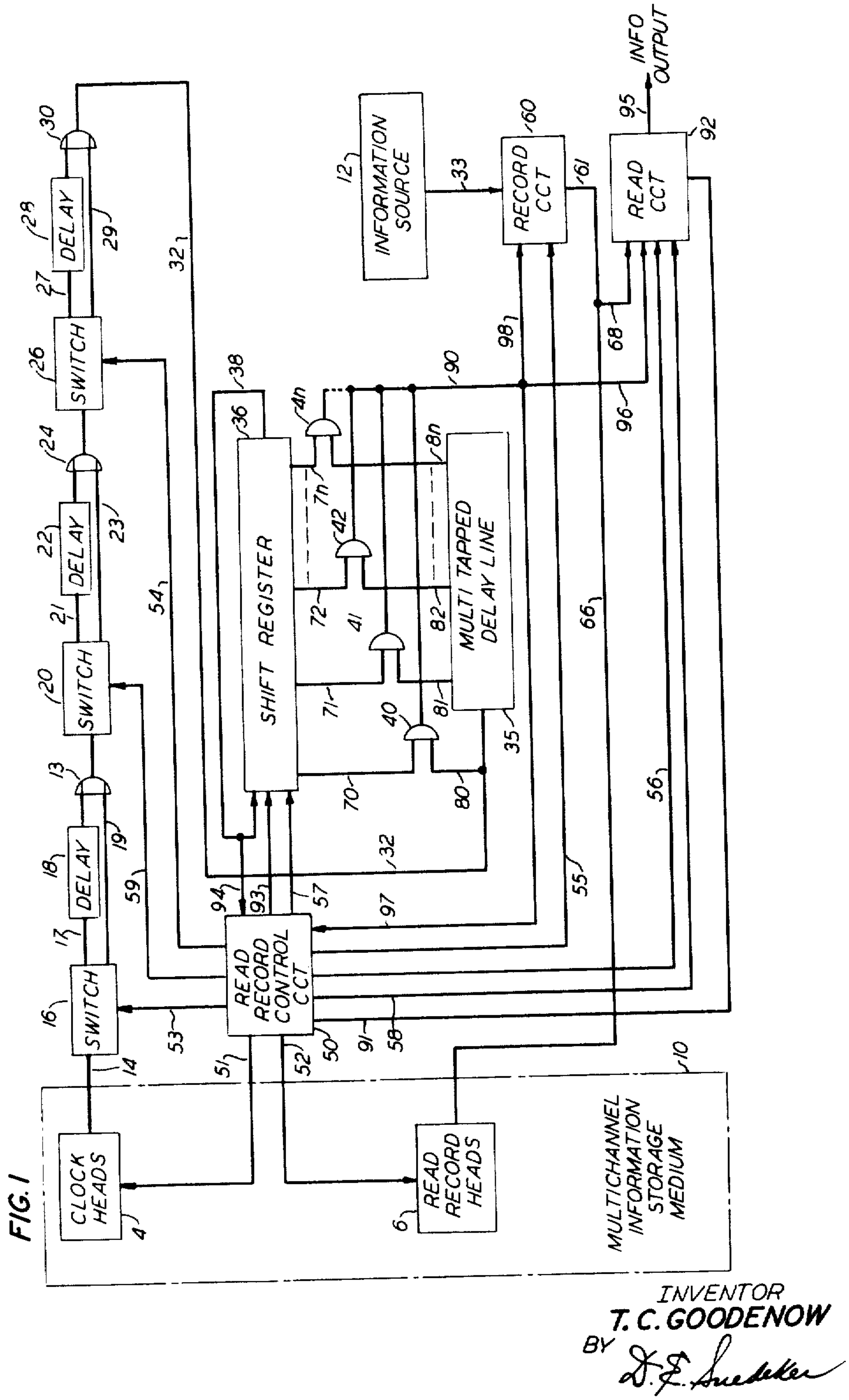

This invention relates to information storage systems and, more particularly, to timing arrangements for timing the transfer of information to and from multichannel information storage mediums.

In information storage systems employing multiple, channel storage mediums, such as a magnetic disk or drum, it is well known to associate individual transducers with each of the storage channels and to utilize one or more transducers associated with clock channels disposed on the storage medium to control the timing of the transfer of information to and from the storage medium. The clock channel, or channels, generally provide individual timing or clock pulses associated with each discrete storage location within the respective storage channels of the storage medium, such as for each bit storage location, and further often provide a clock pulse associated with predetermined locations therein, such as at the beginning of each word block or each sector in the respective storage channels. It is also well known in the case of magnetic disk storage mediums to divide each storage disk of the medium into a number of concentric storage zones and to utilize separate timing channels for the respective storage zones, transfer of information to and from the storage channels in the respective zones being effective at discrete zone frequencies in accordance with clock pulses from the individual zone timing channels.

It has been recognized that even though a bit of information is transferred to the storage medium and recorded in a storage location precisely synchronized with a particular clock pulse, the position of the corresponding readout signal with respect to that clock pulse can vary significantly so as to affect proper readout in a high density storage system. This readout variation is sometimes referred to as copy delay and principally comprises logic delays due to the particular read-record circuitry, and transducer delays due to variations between the individual transducers associated with the respective storage channels. The logic delay is the same for all of the storage channels in the system, assuming common read-record circuitry, and it is constant except for a change due to the changing of a circuit or circuit component in the read-record circuitry. However, the delays due to transducer variations may differ from channel to channel in the system, since each channel has associated therewith its own individual transducer.

Additional timing variations affecting readout occur due to mechanical jitter in the system, and due to the effects of temperature fluctuations. Mechanical jitter and temperature fluctuations also give rise to information recording problems in a high density information storage system inasmuch as they cause shifts in timing between the clock pulses and the information. One result is that information being currently recorded is shifted relative to information earlier recorded, and if the shift is sufficient it may produce an overwrite condition wherein a portion of the information being currently recorded is written over a portion of that earlier recorded.

The copy delay problem is typical minimized by manual timing adjustments made each time the system is placed in operation and remade subsequently from time to time as components age or are changed. This, of course, means an average timing adjusting must be made to compensate for the delays due to the different transducer variations for the various storage channels or that an adjustment must be made individually for each storage channel.

The solution to the overwrite problem commonly employed is to provide a sufficient guard space between successive information locations to accommodate the maximum shift anticipated due to jitter and temperature fluctuations. Of necessity, this solution decreases the quantity of information that can be recorded in a storage channel, and to an undesirable extent particularly where the number of distinct information storage areas or sectors per channel that must be guarded is large.

An arrangement for automatically adjusting clock pulse timing prior to readout to compensate for copy delay and other readout timing variations is disclosed in J. Sliwkowski patent application Ser. No. 542,965, filed of even date herewith. Therein, a set of check bits recorded preceding each information channel storage sector is employed to vary the phase of the clock pulses for informa-readout to ensure that the clock pulses are nominally centered in the information bit storage locations. However, this arrangement cannot be utilized also to compensate for the effects of mechanical jitter and temperature fluctuations on information recording. It has been found that if such an arrangement is used to control timing for information recording, then it cannot be used to alleviate the readout copy delay problem relative to the information so recorded.

It is therefor a general object of this invention to provide a simple, compact, and economical arrangement for accurately controlling the timing of the transfer of information both to and from a multichannel information storage medium.

More particularly, it is an object of this invention to provide a simple and economical timing arrangements which automatically compensates for copy delay, overwrite, and other recording and readout timing variations with respect to the various storage channels in a multichannel magnetic storage medium.

In accordance with a feature of my invention, the above and other objects are attained in an illustrative embodiment of an information storage timing arrangement employing first and second sets of check bits recorded in the individual storage channels of a multichannel information storage system for controlling clock pulse timing during recording and during readout of information from the individual storage channels. Advantageously, first and second sets of check bits are recorded immediately preceding each information storage area or sector within the respective storage channels. The check bits are recorded when the system is initially placed in operation, and thereafter the first check bits are read out and employed to adjust clock pulse timing for information recording, and the second check bits are read out and employed to adjust clock pulse timing for readout of the recorded information.

According to a further feature of my invention the first check bits are initially recorded and are then employed to adjust clock pulse timing for recording the second check bits. The timing relationship between the first and second check bits in each information storage channel, therefore, is representative of copy delay for the respective storage channel and is retained through any subsequent temperature fluctuations. This permits use of the first check bits to compensate for temperature fluctuations and jitter during recording and use of the second check bits to compensate for copy delay and other timing variations during readout.

The above and other objects and features of the present invention may be fully apprehended from the following detailed description when considered with reference to the accompanying drawing in which:

FIG. 1 shows an illustrative embodiment of an information storage timing arrangement in accordance with the principles of the invention; and FIGS. 2A through 2E show various waveforms useful in describing the operation of the invention.

The illustrative embodiment of the invention shown in FIG. 1 of the drawing is depicted in an information storage system for transferring information to and from respective information storage channels of multichannel information storage medium 10. Storage medium 10 may comprise, for example, an arrangement of one or more magnetic disks or magnetic drums each having a plurality of concentric or parallel information storage channels. As is well known in the art, a plurality of transducers or read-record heads 6 are individually associated with respective ones of the storage channels for recording information in and reading information out of the respective storage channels. Read-record heads 6 are individually selected for connection over leads 66 and 68 to read circuit 92 during read operation by read-record control circuit 50 via circuit path 52. Similarly, read-record control circuit 50 is employed for head selection purposes during recording operation to connect individual ones of read-record heads 6 over leads 66 and 61 to record circuit 60. Read-record control circuit 50 may comprise any of the well-known circuitry in the art for performing the head selection operations.

Each of the information storage channels of storage medium 10 comprises a plurality of individual storage locations in which respective bits of information may be recorded. The bit storage locations in each storage channel may be arranged in information word blocks and in storage sectors, as is well known in the art. For example, the storage channels may be arranged in a plurality of sequential storage sectors, the storage channels each containing a plurality of multibit word locations within the individual storage sectors.

Timing for the transfer of information to and from the various storage channel locations is controlled by one or more clock channels disposed on storage medium 10 which, via clock heads 4, provide suitable clock pulses on lead 14. The clock channels provide individual clock pulses associated with each bit storage location and, further, may provide clock pulses associated with predetermined locations within each storage channel such as the start of each of the storage sectors. Moreover, it is known to divide each disk face of the magnetic disk storage medium into a number of multichannel concentric zones and to utilize separate clock channels for bit timing of the respective zones, transfer of information to and from the storage channels in the respective zones being effected at distinct zone frequencies in accordance with clock pulses from the individual zone clock channels. In such a magnetic disk storage medium, the clock head 4 associated with the appropriate zone clock channel is selected in known manner by read-record control circuit 50 over circuit path 51.

Information from information source 12 is provided over lead 33 to record circuit 60 for recording in particular locations in the storage channels of storage medium 10. Recording of the information may be accomplished in any of the known forms. However, it will be assumed herein for the purposes of description that a nonreturn-to-zero form of recording is used wherein one polarity of magnetization represents a binary one and the other polarity represents a binary zero, a transition between polarities occurring only when the character of a bit changes from that of its immediate predecessor. Clock pulses on lead 14 are provided in the manner described below over lead 98 to record circuit 60. The recording of information by record circuit 60 is thus effected in discrete bit storage locations on storage medium 10 defined by the respective bit clock pulses provided on lead 98.

During readout of the recorded information, the readout signal on lead 66 from storage medium 10 must be sampled or strobed under control of respective clock pulses on lead 96 to determine the polarity of magnetization in the individual bit locations. Even though a bit of information is recorded in a bit storage location precisely synchronized with a particular clock pulse, the position of the readout signal with respect to that clock pulse can vary significantly. This may be due, for example, to logic delays presented by the particular read-record circuitry and to delays presented by the variations between the read-record heads associated with the respective information storage channels.

Further, mechanical jitter in the system and temperature fluctuations cause timing problems in connection with the recording of information in the respective channels of storage medium 10. The consequent shifts in timing between the clock pulses and the information may result in the shifting of information currently being recorded relative to information earlier recorded such that an overwrite condition is produced.

In accordance with my invention first and second sets of timing check bits are recorded in each storage sector. The check bits are recorded when the system is initially placed in operation, and they are thereafter read out and employed to adjust clock pulse timing to compensate for copy delay, temperature fluctuations, and the like during readout and during recording of information. By way of example, the first and second sets of check bits may be sequences of alternate binary ones and zeros to provide a series of magnetization transitions for timing adjustment. They may be recorded at the clock pulse bit frequency, via information source 12 and record circuit 60, as shown by way of illustration in FIG. 2A, or they may be recorded at a submultiple of the clock pulse bit frequency, if desired. Moreover, as shown illustratively in FIG. 2A, the check bits may be recorded in the control space or sector which is normally provided between storage sectors for such operations as switching between storage channels, receiving read or record instructions, switching between read and record circuitry, and the like. In this manner the check bits recorded in the information storage channels do not decrease the quantity of information that can be recorded in the respective storage channels.

Figure 2:
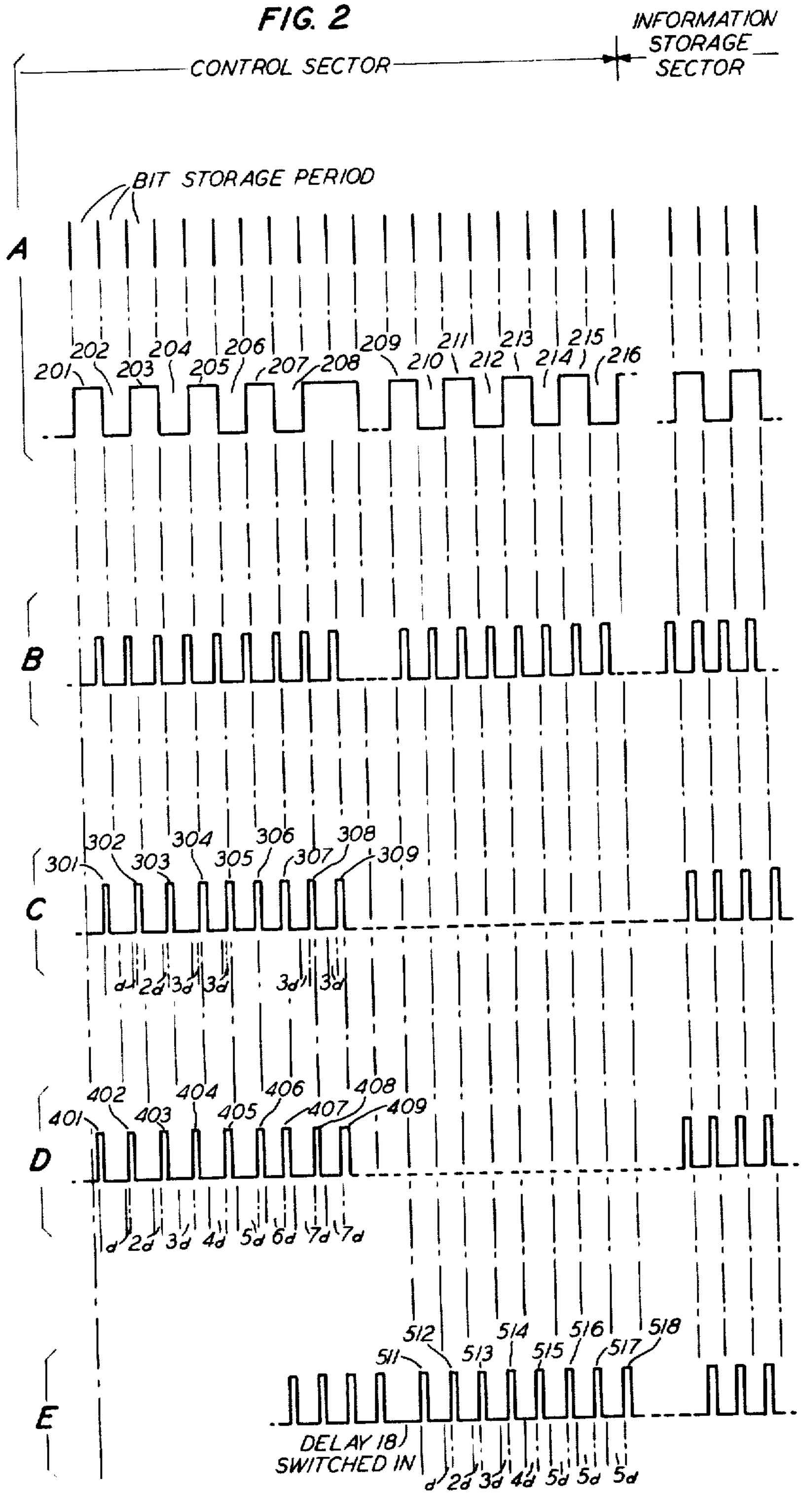

When the system is placed in operation, the first sets of check bits, such as first check bits 201 through 208 in the illustrative control sector shown in FIG. 2A, are recorded initially. For this purpose the check bits may be provided by information source 12 over lead 33 to record circuit 60. The first check bits recorded in each of the control sectors are then employed to adjust clock pulse timing in the manner described in detail below for recording the respective second sets of check bits, such as second check bits 209 through 216 in the illustrative control sector shown in FIG. 2A. The timing relationship between the first and second check bits in each information storage channel is therefore representative of copy delay for the respective storage channel and is retained through any subsequent temperature fluctuations. This permits use of the first check bits to compensate for temperature fluctuations and jitter during recording of information and use of the second check bits to compensate for copy delay and other timing variations during readout.

When recording the first check bits in the manner just indicated, delay circuit 22 is advantageously switched into the clock pulse path between lead 14 from clock heads 4 and lead 98 to record circuit 60. The clock pulse path may be traced at this point from lead 14 through switch 16, over lead 19, through OR gate 13 and switch 20, over lead 21, through delay circuit 22, OR gate 24, and switch 26, over lead 29, through OR gate 30, over leads 32 and 80, and through gate 40 to leads 90 and 98.

Delay circuit 22 is switched into the clock pulse path by the operation of switch 20, under the control of read-record control circuit 50 over lead 59, at the time recording of the first check bits is initiated. Delay circuit 22 remains in the clock pulse path only during recording of the first check bits and is switched out of the clock pulse path at all other times, the clock pulses bypassing delay circuit 22 via lead 23. A predetermined period of delay is provided by delay circuit 22 so as to shift the recorded position of the first check bits relative to the clock pulses recorded on storage medium 10. This delay, which may be on the order of one-fourth to one-half bit period, permits use of the first and second check bits to compensate for subsequent system timing variations in either a positive or a negative direction.

The particular illustrative embodiment shown in FIG. 1 of the drawing for utilizing the recorded check bits to automatically compensate for copy delay, temperature fluctuations, and other timing variations comprises delay circuits 18 and 28 having fixed periods of delay and multitapped delay line 35 having a plurality of outputs 81 through 8*n* for selectively providing a variable period of delay. Delay circuit 18 provides a fixed period of delay during readout to compensate for the minimum readout timing adjustment that is necessary for the particular system. Delay circuit 18 is switched into the clock pulse path between lead 14 and lead 90 by the operation of switch 16, under the control of read-record control circuit 50 over lead 53, at the time read operation is initiated. Delay circuit 28 provides a fixed period of delay on the order of one-half bit period which is switched into the clock pulse path by the operation of switch 26 under the control of read-record control circuit 50 over lead 54. The variable amount of delay connected into the clock pulse path by delay line 35 during readout or recording of information is controlled incrementally by shift register 36 in the manner described below.

For the purposes of describing the operation of the information storage timing arrangement in FIG. 1 of the drawing, assume that an information bit storage period is 500 nanoseconds and that the minimum readout timing delay variation for the system is 300 nanoseconds. Thus, delay circuit 18 provides a fixed period of delay of 300 nanoseconds during readout of information of check bits. Delay circuit 28 is assumed to provide a fixed period of delay of one-half bit period, or 250 nanoseconds. It will be further assumed, by way of example, that eight first check bits 201 through 208 and eight second check bits 209 through 216 are recorded in the control sector preceding each information storage sector, as depicted in FIG. 2A of the drawing, and that delay line 35 has a total length of 350 nanoseconds with seven output leads 81 through 8*n* connected thereto at substantially equally spaced intervals of 50 nanoseconds.

Shift register 36 is a recirculating shift register and has stored therein a single binary bit which may be shifted from left to right in FIG. 1 through the successive stages of shift register 36 by successive advance pulses on lead 93 from read-record control circuit 50. Shift register output leads 70 through 7*n* are individually connected to respective stages of shift register 36, and an output signal is provided on one of leads 70 through 7*n* according to which stage the bit is currently registered in. Initially, prior to timing adjustment for readout or recording of information, the bit is registered in the first stage of shift register 36, providing an output signal on lead 70 to enable gate 40.

During the recording of information in storage medium 10, clock pulses on lead 14 are directed through the delay circuitry to lead 90 and over lead 98 to record circuit 60. During the readout of information from storage medium 10, clock pulses on lead 14 are directed through the delay circuitry to lead 90 and over lead 96 to read circuit 92. The delay circuitry of FIG. 1 is controlled by the first check bits during recording and by the second check bits during readout to provide predetermined phase relationships between the clock pulses and the bit storage periods. For example, it is assumed herein that it is desired to nominally center the clock pulses in the bit storage periods for readout of information and to nominally position the clock pulses at the leading edges of the bit storage periods for recording of information.

Assume that information is to be recorded in a particular storage sector of one of the storage channels of storage medium 10, and that read-control circuit 50 has selected the appropriate read-record head 6 and the appropriate clock head 4. The selected read-record head 6 reads out the first check bits in the control sector preceding the particular channel storage sector in which information is to be recorded and directs these check bits over leads 66 and 68 to read circuit 92. Switches 16, 20 and 26 are operated by read-record control circuit 50 in such manner as to direct clock pulses read out on lead 14 through switch 16 and delay circuit 18, or through OR gate 13 and switch 20, over lead 23, through OR gate 24 and switch 26, over lead 29, through OR gate 30 and enabled gate 40, over leads 90 and 96 to read circuit 92. Neither of delay circuits 22 and 28 are connected in the clock pulse path by read-record control circuit 50 at this point. Delay circuit 18 is connected in the clock pulse path only during readout of the check bits, and it is switched out of the clock pulse path by read-record control circuit 50 prior to the recording of information. Read circuit 92 is enabled during readout of the first check bits in the control sector by read-record control circuit 50, via lead 56, to receive the clock pulses on lead 96 and the check bits on lead 68.

FIG. 2B of the drawing shows the clock pulses as they may appear illustratively on lead 96 to read circuit 92 in the absence of any timing adjustments. It has been assumed that some variation has occurred in the timing of the clock pulses, due for example to a fluctuation in temperature. The adjustments made in the illustrative clock pulse timing prior to information recording to compensate for the timing variations are depicted in FIG. 2C of the drawing and are described in detail hereinbelow.

Each of the clock pulses on lead 96 is matched for coincidence with a first check bit transition by known matching or comparator circuitry in read circuit 92 which, responsive to such coincidence, provides a coincidence signal over lead 91 to read-record control circuit 50. The coincidence signal on lead 91 indicates that the clock pulse timing is such that the clock pulses are nominally positioned at the leading edge of the bit storage periods for information recordation. Responsive to the coincidence signal on lead 91, read-record control circuit 50 disables read circuit 92 and operates switch 16 to disconnect the fixed delay of delay circuit 18 from the clock pulse path. The delayed clock pulses on lead 90 are directed over lead 98 to record circuit 60, which is enabled for recording operation by read-record control circuit 50 via lead 55.

In the illustrative example shown in FIGS. 2B and 2C of the drawing, the timing variation for the particular storage channel, whether due to jitter, temperature fluctuations, or whatever is assumed to be such that the first clock pulse appearing on lead 96 during readout of the first check bits on lead 68, that is clock pulse 301, does not coincide with a first check bit transition. In the absence of such coincidence no coincidence signal is provided on lead 91 by read circuit 92. Read-record control circuit 50 accordingly provides a signal on lead 93 to advance the bit in shift register 36 to the second stage thereof, disabling gate 40 and enabling gate 41 via lead 71. The next clock pulse on lead 14, clock pulse 302 in FIG. 2C of the drawing, is directed through a portion of delay line 35 over output lead 81 through enabled gate 41 to leads 90 and 96. Clock pulse 302 on lead 96 is thus delayed through delay line 35 by a predetermined period of delay $d$, illustratively 50 nanoseconds, as shown in FIG. 2C.

If coincidence does not occur between clock pulse 302 and a first check bit transition, there is no coincidence signal on lead 91 from read circuit 92 and read-record control circuit 50 again provides a signal on lead 93 to advance shift register 36, enabling gate 42 via lead 72 and disabling gate 41. Accordingly, clock pulse 303 is directed through a portion of delay line 35 to output lead 82 and through enabled gate 42 to leads 90 and 96, delayed by an additional predetermined period of delay $d$ of 50 nanoseconds, or a total delay of $2d$ as shown in FIG. 2C. This manner of operation continues, incrementing the clock pulse delay on lead 96 until concidence is obtained between one of clock pulses 301 through 308 and a first check bit transition. Such coincidence is assumed to occur, by way of example, with clock pulse 304 in the illustrative example of FIG. 2C.

Responsive thereto, read-record control circuit 50 halts the advance of shift register 36 by failing to direct any further advance signals thereto on lead 93, and thus shift register 36 continues to enable gate 42. Successive clock pulses such as clock pulses 305 through 309, are directed through enabled gate 42 to lead 96, thus delayed a period $3d$ of 150 nanoseconds, and each coincides with a successive check bit transition such that no further advance signals are provided by read-record control circuit 50 on lead 93.

Each clock pulse on lead 90 is also directed over lead 97 to read-record control circuit 50. During the timing adjustment period prior to a recording operation, read-record control circuit 50 is responsive to the last clock pulse in the interval of the first check bits in the control sector, that is clock pulse 308, to operate switch 16 and to disable read circuit 92. Operation of switch 16 removes delay circuit 18 from the clock pulse path. Record circuit 60 is then enabled by read-record control circuit 50 over lead 55 for information recording.

If after readout of all of first check bits 201 through 208 coincidence is not obtained with one of the clock pulses, shift register 36 will have been operated through a complete cycle and the bit of information therein will be in the last stage of shift register 36. The resulting shift register output signal on lead 7$n$ enables gate 4$n$ to direct all clock pulses on lead 32 therethrough over leads 90 and 98 to record circuit 60. The fact that coincidence was not obtained indicates that the clock pulse timing variation is beyond the adjustment range of the illustrative embodiment. Accordingly, information recording will be effected with some portion of the timing variation uncompensated for. This clock pulse situation is depicted in FIG. 2D of the drawing, successive ones of clock pulses 402 through 408 being delayed incrementally up to the total of 350 nanoseconds provided by delay line 35. This situation can, of course, be readily eliminated by sufficiently increasing the adjustment range of the timing circuit of FIG. 1, such as through additional delay line increments or through larger increments.

In either event upon completion of the recording of information in a storage sector, the timing arrangement in FIG. 1 is reset to its initial state preparatory for the next read or record operation. Shift register 36 is reset by read-record control circuit 50 via lead 57, thus enabling gate 40 over lead 70. Switches 16, 20, and 26 are operated by read-record control circuit 50 to disconnect delay circuits 18, 22, and 28 from the clock pulse path.

Prior to readout of information from a storage sector of one of the channels of storage medium 10, clock pulse timing is automatically adjusted by the arrangement of FIG. 1 in a manner similar to that described above, except that the second check bits are employed. For example, assume that at some later time it is desired to read out the information recorded in the information storage sector of the channel depicted in FIG. 2A of the drawing. Read circuit 92 is enabled by read-record control circuit 50, via lead 56, at a point in time subsequent to readout on lead 68 of the last of the first check bits and prior to the first of the second check bits in the control sector, that is between check bits 208 and 209 in FIG. 2A.

Once enabled, read circuit 92 looks for coincidence between one of the clock pulses on lead 96 and a magnetization transition of one of second check bits 209 through 216. The timing of the clock pulses on lead 96 is initially adjusted to compensate for the minimum variation for the system by connection of delay circuit 18 into the clock pulse path. Thus upon receipt of a read instruction read-record control circuit 50, via lead 53, operates switch 16 to connect delay circuit 18 into the clock pulse path. Clock pulses on lead 14, therefore, are directed by switch 16 over lead 17 through delay circuit 18 and OR gate 13. Neither of delay circuits 22 and 28 is connected into the clock pulse path, nor is any portion of delay line 35 at this point. Delay circuit 18 is connected into the clock pulse path for readout at any point in time prior to readout of the first of second check bits 209 through 216, such as shown in FIG. 2E of the drawing. All subsequent clock pulses on leads 90 and 96 during readout, clock pulses 511 et seq., are thus delayed by an initial fixed amount determined by delay circuit 18.

During readout of second check bits 209–216 on lead 68, shift register 36 is successively advanced in the manner described above, incrementally increasing the delay in the clock pulse path through delay line 35, until coincidence is obtained between a second check bit transition on lead 68 and one of clock pulses 511 through 518 on lead 96. Such coincidence is illustratively depicted as occurring with clock pulse 516 in FIG. 2E. Responsive thereto, read-record control circuit 50 halts the advance of shift register 36, which thus continues to enable gate 75 (not shown) connecting the portion of delay line 35 between leads 32 and 85 (not shown) into the clock pulse path. Upon readout of the last of second check bits 209–216 and prior to readout of the first information bit, read-record circuit 50 operates switch 26, connecting delay circuit 28 in the clock pulse path to nominally center the clock pulses in the bit storage periods, as described above. Delay circuit 18 remains connected in the clock pulse path during readout of the information in the succeeding information storage sector. Read circuit 92 is enabled for information readout on lead 95 by read-record control circuit 50 over lead 58.

If coincidence is not obtained with one of the second check bit transitions prior to information readout, shift register 36 will continue to enable gate 4$n$ so as to introduce the total length of delay line 35 into the clock pulse path during information readout, in the same manner as described above in connection with information recording. Delay circuit 28 is, of course, connected into the clock pulse path for information readout as described above.

It is to be understood that the above-described arrangements are merely illustrative of the principles of the present invention. Numerous other arrangements may be devised by those skilled in the art without departing from the spirit and scope of the invention.

What is claimed is:

1. In a multichannel information storage system employing a source of clock pulses for controlling the recording and readout of binary information relative to individual storage areas in each channel of said system the combination for providing predetermined phase relationships between said clock pulses and said information relative to each of said storage areas during recording and during readout of said information comprising record means, first means including said record means controlled by said clock pulses for recording a respective first pattern of binary check digits in said storage system associated with the storage areas of each of said channels, clock pulse phase adjusting means, second means including said record means and said adjusting means controlled by said clock pulses and said respective first check digits for recording respective second patterns of binary check digits in said storage system associated with the storage areas of each of said channels, and means for directing said respective first check digits associated with a selected storage area of one of said channels to said adjusting means prior to recording of information in said selected storage area, and for directing said respective second check digits associated with said selected storage area to said adjusting means prior to readout of information from said selected storage area, said phase adjusting means being responsive to said respective check digits directed thereto for controlling the phase of said clock pulses to obtain said predetermined phase relationships between said clock pulses and said respective check digits.

2. The combination in accordance with claim 1 wherein said second means is responsive to said first check digits to adjust the phase of said clock pulses to obtain a first predetermined phase relationship therebetween relative to the storage areas in said system in which said second check digits are recorded by said second means, thereby providing a variable phase relationship between said first and second check digits in each channel of said system determined by the record-readout characteristics of said individual channels.

3. The combination in accordance with claim 1 wherein the storage areas in each of said channels are arranged in a plurality of storage sectors each preceded by a respective control sector, and wherein said first and second means are operative to record respective first and second check digits associated with individual ones of said storage sectors in said respective control sectors preceding said individual storage sectors.

4. The combination in accordance with claim 3 wherein said respective first and second check digit patterns each comprise a series of digits of alternating binary character, and wherein said clock pulse phase-adjusting means is responsive to said respective first check digits for controlling the phase of said clock pulses until said clock pulses coincide with the leading edge of said first check digits and is responsive to said respective second check digits for controlling the phase of said clock pulses until said clock pulses are substantially centered in said second check digits.

5. The combination in accordance with claim 4 wherein said clock pulse phase adjusting means comprises means for varying the phase of said clock pulses until said clock pulses coincide selectively with the leading edges of said first check digits or with the leading edges of said second check digits, and means responsive to said coincidence with the leading edges of said second check digits for varying the phase of said clock pulses by a fixed amount to substantially center said clock pulses in said second check digits.

6. The combination in accordance with claim 1 wherein said clock pulse phase adjusting means comprises means for incrementally delaying successive ones of said clock pulses until said delayed clock pulses coincide with predetermined portions of said check digits, and means for providing said delayed clock pulses in said system for controlling the recording and readout of binary information relative to said storage areas respectively associated with said check digits.

7. The combination in accordance with claim 6 wherein said clock pulse phase adjusting means further comprises means responsive to said coincidence for varying the phase of said delayed clock pulses by a first fixed amount to obtain a predetermined phase relationship between said clock pulses and said storage areas during recording.

8. The combination in accordance with claim 7 further comprising delay means operative for varying the phase of said clock pulses by a predetermined amount, and means for operating said delay means prior to readout of said first and second check digits and for maintaining said delay means operated during readout of information from said storage system.

9. The combination in accordance with claim 1 whereing said first means further comprises fixed delay means and means for connecting said fixed delay means in circuit with said clock pulses during recording of said first check digits, whereby said first check digits are recorded in said storage system having a predetermined phase relationship with said clock pulses in said system.

References Cited

UNITED STATES PATENTS

| | | | |
|---|---|---|---|
| 3,054,958 | 9/1962 | Bensky et al. | 328—56 |
| 3,226,685 | 12/1965 | Potter et al. | 340—172.5 |

ROBERT C. BAILEY, *Primary Examiner.*

R. M. RICKERT, *Assistant Examiner.*